April 22, 1930.                    P. SCHWENKE                    1,755,797
                              FUSE FOR SUBMARINE BOMBS
                                Filed Jan. 18, 1929
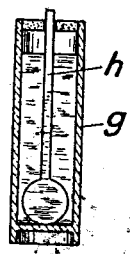
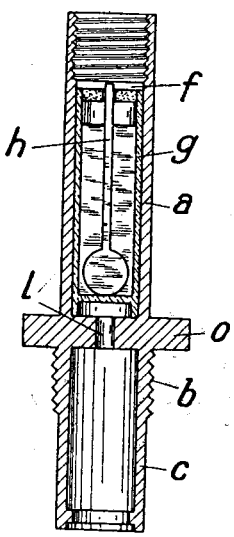
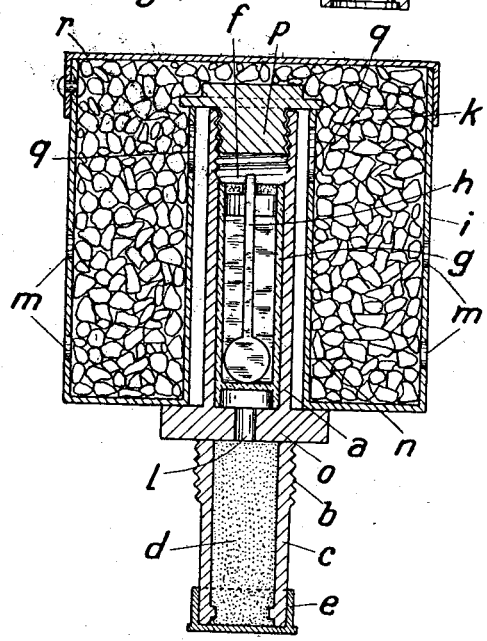

Patented Apr. 22, 1930

1,755,797

UNITED STATES PATENT OFFICE

PAUL SCHWENKE, OF ZERBST, ANHALT, GERMANY

FUSE FOR SUBMARINE BOMBS

Application filed January 18, 1929, Serial No. 333,419, and in Great Britain January 23, 1928.

This invention relates to hydrostatic fuses of shells, bombs and the like.

Hydrostatic fuses heretofore proposed have been of the common type in which a substance such as sodium or potassium is contained in a receptacle in the shell or bomb, so that when either of the latter becomes submerged in water, the substance is ignited by contact with the water, whereupon the explosive contained in the body of the shell or bomb is either fired directly or through the medium of guncotton or the like which is ignited by the burning sodium.

According to the present invention a hydrostatic fuse for a bomb comprises a heat conducting sleeve element the lower end of which containing an ignitable substance such as gunpowder is secured in the end of the bomb, and communicates with the upper projecting end in which a glass tube containing a substance capable of ignition when brought into contact with an acid is supported, the acid being contained within a second glass tube arranged within the upper part of the sleeve element so that, when the bomb becomes submerged, water entering apertures in a receptacle surrounding the upper end of the sleeve element and containing a substance capable of generating heat when brought in contact with water, generates heat which is transmitted to the acid tube causing it to expand and finally break so as to allow its contents to admix with the material contained in the first mentioned glass tube whereupon the flame produced fires the explosive in the bomb through the medium of the gunpowder in the lower end of the sleeve element.

An embodiment of the invention is illustrated by way of example in the accompanying drawing, in which:—

Fig. 1 shows in longitudinal section the vessels containing the liquid and the chemical substance.

Fig. 2 shows the vessels shown in Fig. 1 mounted in the sleeve.

Fig. 3 is a sectional elevation showing the whole fuse.

A metal sleeve $a$ is screwed with its threaded portion $b$ into the bomb, not shown, so that the portion $c$ of the sleeve projects into the explosive charge of the bomb.

This portion $c$ of the sleeve is filled with gun-powder or the like and closed by a cap $e$.

In the upper portion of $f$ of the sleeve $a$ a glass-tube $g$ is mounted which is filled with a chemical substance designed to produce a flame as soon as it comes into contact with an acid. As chemical substance potassium chlorate may be cited, sulphuric-acid being an acid adapted for the purpose. This sulphuric-acid is contained in a glass-tube $h$ enclosed in the glass-tube $g$. The glass-tube $h$ has preferably the shape of a thermometer-glass-tube, and it is not completely filled with acid.

A vessel $i$ encloses the part $f$ of sleeve $a$ and is filled with a substance $k$, which, as soon as it comes into contact with water, is slacked like lime and generates heat.

This heat is transmitted to the sleeve $a$ and to the acid in the sleeve.

The acid in the glass-tube $h$ expands and makes the glass-tube burst so that the acid can flow into the chemical substance and a flame is produced which, through a central bore $l$, ignites the gun-powder $d$ so that the explosive charge in the bomb is fused.

Water flows into the substance $k$ through openings $m$ in the wall of the vessel $i$ as soon as the bomb drops into the water.

The vessel $i$ is double-walled, the inner cylindrical wall $n$ resting upon a flange $c$ of sleeve $a$ and being held by a stopper $p$ in the upper end of the sleeve $a$.

The inner wall $n$ has openings $o$ to facilitate the transmission of heat to sleeve $a$.

The vessel $i$ has a removable lid so that, when this lid is removed, the stopper $p$ can be screwed on the threaded top-end of sleeve $a$ and the vessel $i$ can be filled.

The vessel $i$ might be directly connected with the sleeve $a$, in which case the inner wall $n$ is not required, the stopper $p$ forming at the same time the lid of the vessel. The vessel $i$ may be of any desired dimensions.

The substance $k$ in the vessel $i$ is preferably first quality carbide, metallic sodium, metallic potassium or the like.

Any other suitable chemical substance may be substituted for the potassium chlorate and any other suitable acid for the sulphuric acid.

The improved fuse may be used alone or together with a percussion-fuse, the shell of the bomb having in the latter case a second internally threaded hole.

I claim:

A hydrostatic fuse for a bomb comprising a heat conducting sleeve element the lower end of which containing an ignitable substance, such as gunpowder, is secured in the end of the bomb and communicates with the upper end projecting from the bomb, a glass tube containing a substance capable of ignition when brought into contact with an acid supported in said projecting end of the sleeve, a second glass tube, arranged within the upper part of the sleeve element, containing the acid, a receptacle surrounding the upper end of the sleeve element having apertures and containing a substance capable of generating heat when brought in contact with water flowing in through said apertures when the bomb becomes submerged this heat transmitted to the acid tube causing it to expand and to finally break so as to allow its contents to admix with the material contained in the first mentioned glass tube whereupon the flame produced fires the explosive in the bomb through the medium of the gunpowder in the low end of the sleeve element.

In testimony whereof I affix my signature.

PAUL SCHWENKE.